(12) United States Patent
Maseki et al.

(10) Patent No.: US 9,370,849 B2
(45) Date of Patent: Jun. 21, 2016

(54) FLEXIBLE MANUFACTURING SYSTEM

(71) Applicant: JTEKT CORPORATION, Osaka-shi (JP)

(72) Inventors: Katsuhiro Maseki, Nagoya (JP); Kazuhiro Tsujimura, Okazaki (JP); Masanori Ando, Nishio (JP); Takaaki Sugiura, Chita-gun (JP)

(73) Assignee: JTEKT CORPORATION, Osaka-shi (JP)

( * ) Notice: Subject to any disclaimer, the term of this patent is extended or adjusted under 35 U.S.C. 154(b) by 8 days.

(21) Appl. No.: 14/451,895

(22) Filed: Aug. 5, 2014

(65) Prior Publication Data

US 2015/0053529 A1    Feb. 26, 2015

(30) Foreign Application Priority Data

Aug. 22, 2013 (JP) ................................ 2013-172519

(51) Int. Cl.
    *G06F 19/00* (2011.01)
    *B23Q 3/00* (2006.01)
    *B23Q 7/14* (2006.01)
    (Continued)

(52) U.S. Cl.
CPC ................ *B23Q 3/00* (2013.01); *B23Q 7/1426* (2013.01); *B23Q 41/00* (2013.01); *B65G 17/005* (2013.01); *G05B 19/4189* (2013.01); *G05B 19/41865* (2013.01); *Y02P 90/20* (2015.11); *Y02P 90/28* (2015.11)

(58) Field of Classification Search
CPC ................................................ G05B 19/41865
USPC ........... 198/571, 572, 575, 358, 349.5, 346.1; 700/100, 101, 102, 103
See application file for complete search history.

(56) References Cited

U.S. PATENT DOCUMENTS 3,796,163 A * 3/1974 Meyer .................... B23Q 41/06
                                                                                 104/88.04
3,952,388 A     4/1976 Hasegawa et al.

(Continued)

FOREIGN PATENT DOCUMENTS

DE     24 35 622 A1     3/1975
EP     2 181 801 A1     5/2010

(Continued)

OTHER PUBLICATIONS

Extended European Search Report issued on Dec. 23, 2014 in European Patent Application No. 14180935.0.

(Continued)

*Primary Examiner* — Gene Crawford
*Assistant Examiner* — Lester Rushin
(74) *Attorney, Agent, or Firm* — Oblon, McClelland, Maier & Neustadt, L.L.P

(57) ABSTRACT

A flexible manufacturing system that makes it possible to give a higher priority to machining of a workpiece that is a super-urgent item is provided. When a pallet to which a workpiece, which is a super-urgent item, is attached is loaded on a loading station, a second controller gives a command to a conveyor to convey a pallet to which a workpiece, which is a normal item, is attached and which is located at a standby position of a pallet changer to a pallet storage room. Then, the second controller controls the conveyor to convey the pallet to which the workpiece, which is the super-urgent item, is attached and which is loaded on the loading station to the standby position.

6 Claims, 13 Drawing Sheets

(51) Int. Cl.
 *B23Q 41/00* (2006.01)
 *G05B 19/418* (2006.01)
 *B65G 17/00* (2006.01)

(56) References Cited

U.S. PATENT DOCUMENTS

| | | | | |
|---|---|---|---|---|
| 4,664,579 | A | * | 5/1987 | Schedwin ............ B65G 47/901 104/135 |
| 4,669,047 | A | * | 5/1987 | Chucta ................... B23Q 7/10 104/88.04 |
| 4,747,193 | A | * | 5/1988 | Hashidate ............ B23Q 7/1442 198/346.1 |
| 4,945,569 | A | * | 7/1990 | Kulman ............... H04R 25/654 181/130 |
| 2006/0269375 | A1 | * | 11/2006 | Takayama .......... B23Q 11/0816 409/134 |
| 2010/0106281 | A1 | | 4/2010 | Niimi et al. |

FOREIGN PATENT DOCUMENTS

| | | |
|---|---|---|
| JP | 2002-6007 | 1/2002 |
| JP | 2004-240474 | 8/2004 |
| JP | 2010-134900 | 6/2010 |

OTHER PUBLICATIONS

U.S. Appl. No. 14/540,411, filed Nov. 13, 2014, Maseki, et al.

* cited by examiner

FIG. 2

| PALLET NO. | POSITION | MODE | ORDER OF PRIORITY | MACHINING STATUS |
|---|---|---|---|---|
| 1111 | P02 | NORMAL | 3 | WAITING |
| 1125 | P01 | NORMAL | 4 | WAITING |
| 2133 | P04 | URGENT | 2 | WAITING |
| 1852 | P09 | NORMAL | 5 | WAITING |
| 1491 | P03 | SUPER-URGENT | 1 | COMPLETED |
| ... | ... | ... | ... | ... |

FLEXIBLE MANUFACTURING SYSTEM

INCORPORATION BY REFERENCE

The disclosure of Japanese Patent Application No. 2013-172519 filed on Aug. 22, 2013 including the specification, drawings and abstract, is incorporated herein by reference in its entirety.

BACKGROUND OF THE INVENTION

1. Field of the Invention

The invention relates to a flexible manufacturing system. The flexible manufacturing system includes: a machining device that machines a workpiece; a pallet changer that exchanges pallets between a standby position and a machining position in the machining device; a pallet storage room that stores pallets to which workpieces have been attached; a loading station onto which a new workpiece is loaded; and a conveyor that conveys the pallets between the loading station, the pallet storage room, and the pallet changer.

2. Description of the Related Art

For example, Japanese Patent Application Publication No. 2010-134900 (JP 2010-134900 A) describes an example of a conventional flexible manufacturing system that allows manufacturing of wide variety of products in small quantities. JP 2010-134900 A describes a technique of conveying pallets disposed in a loading station or a pallet storage room to a standby position of a pallet changer in a prescribed order.

For example, Japanese Patent Application Publication No. 2004-240474 (JP 2004-240474 A) and Japanese Patent Application Publication No. 2002-6007 (JP 2002-6007 A) each describe that when an urgent item is loaded, a high priority is given to processing of the urgent item.

When a workpiece that is a super-urgent item is loaded, it is desirable that the workpiece be machined by a machining device immediately. However, according to the conventional technique, even if a high priority is given to conveyance of the super-urgent item by a conveyor, a workpiece that has already been conveyed to a standby position of a pallet changer is machined next by the machining device. That is, even if the super-urgent item is loaded, it is not possible to machine the super-urgent item prior to the workpiece present at the standby position of the pallet changer. As just described, there is still room for improvement in giving a higher priority to the machining of the super-urgent item.

SUMMARY OF THE INVENTION

One object of the invention is to provide a flexible manufacturing system that makes it possible to give a higher priority to machining of a workpiece that is a super-urgent item.

A flexible manufacturing system according to an aspect of the invention includes:

a machining device that has a machining position where a pallet to which a workpiece is attached is disposed, and machines the workpiece that has not been machined and that is attached to the pallet disposed at the machining position to form a machined product;

a pallet storage room that is able to store a plurality of the pallets;

a loading station through which the pallet to which the new workpiece is attached is loaded into the flexible manufacturing system;

a pallet changer that is provided integrally with or adjacent to the machining device, has a standby position where the pallet to be moved to the machining position of the machining device stands by, and exchanges the pallet at the machining position for the pallet at the standby position;

a conveyor that is able to convey the pallet between the pallet storage room, the loading station, and the standby position of the pallet changer;

a first controller that controls the machining device and the pallet changer; and a second controller that controls the conveyor.

When the pallet to which a workpiece that is a super-urgent item is attached is loaded on the loading station, the second controller controls the conveyor to convey the pallet at the standby position to the pallet storage room and then convey the pallet loaded on the loading station to the standby position.

According to the above aspect, even when the workpiece has already been present at the standby position of the pallet changer, the workpiece is once conveyed to the pallet storage room. Then, the workpiece, which is the super-urgent item, is conveyed to the standby position of the pallet changer. Thus, when the machining of the workpiece that is presently being machined by the machining device is completed, the item to be machined next is the workpiece that is the super-urgent item. That is, it is possible to give a higher priority to the machining of the workpiece, which is the super-urgent item, than the machining of the workpiece that has already been present at the standby position of the pallet changer.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 2 is a table illustrating the information stored in a second controller;

DETAILED DESCRIPTION OF EMBODIMENTS

Hereinafter, the configuration of a flexible manufacturing system according to an embodiment of the invention will be described with reference to FIG. 1 and FIG. 2. Hereinafter, the flexible manufacturing system will be abbreviated as "FMS".

The FMS is a system in which a workpiece W attached to a pallet P is machined by a machining device 10. Workpieces W are sequentially machined based on a manufacturing plan set in advance. However, instead of normal items that are items to be machined based on a manufacturing plan set in advance, workpieces that need to be machined immediately may be loaded. Such workpieces may differ in the degree of urgency. Therefore, a workpiece that needs to be machined more urgently than a normal item will be referred to as "urgent item", and a workpiece that needs to be machined more urgently than an urgent item will be referred to as "super-urgent item". In the FMS in the present embodiment, the manner of conveying pallets P varies among the case where a normal item is loaded, the case where an urgent item is loaded, and the case where a super-urgent item is loaded.

Figure 1:
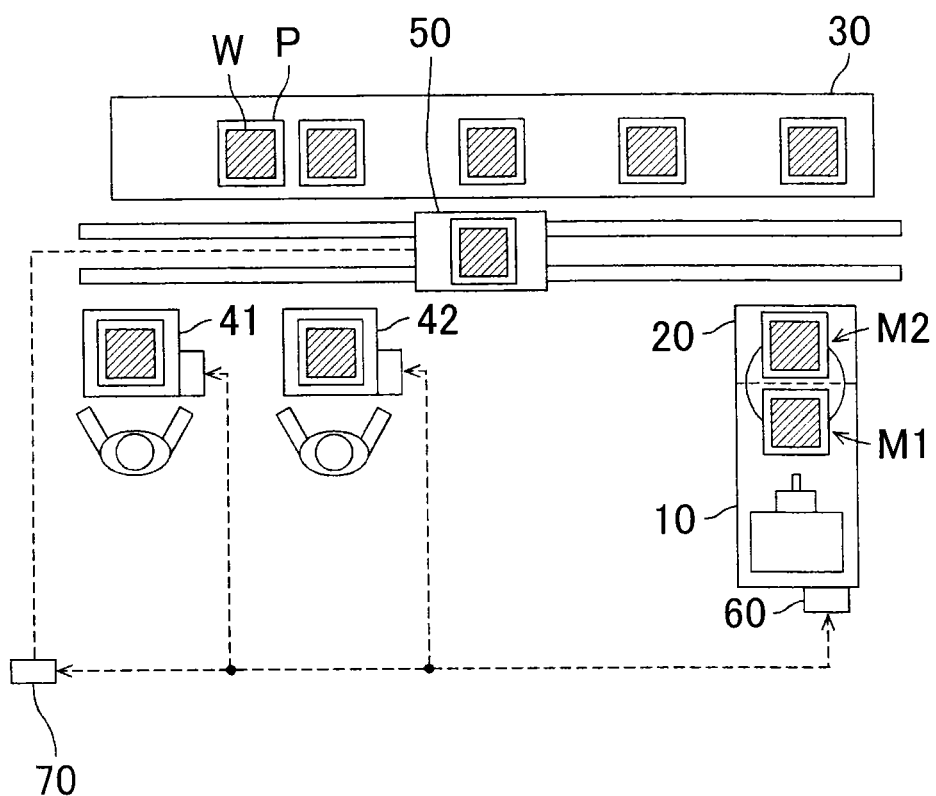
FIG. 1 is an overall configuration diagram illustrating a flexible manufacturing system according to an embodiment of the invention.

As illustrated in FIG. 1, the FMS includes the machining device 10, a pallet changer 20, a pallet storage room 30, loading stations 41, 42, a conveyor 50, a first controller 60, and a second controller 70. Hereinafter, each of the loading stations will be abbreviated as "LD-ST". The machining device 10 machines a workpiece W that has not been machined. As the machining device 10, for example, a machining center is used. However, other kinds of machine tools may be adopted as the machining device 10. The machining device 10 has a machining position M1 where the pallet P to which the workpiece W is attached is disposed. The machining device 10 has one machining position M1. The machining device 10 machines the workpiece W, which has not been machined and which is attached to the pallet P disposed at the machining position M1, to form a machined product.

The pallet changer 20 is provided integrally with the machining device 10 or adjacent to the machining device 10. The pallet changer 20 has a standby position M2 where the next pallet P to be moved to the machining position M1 of the machining device 10 stands by. The pallet changer 20 exchanges the pallet P at the machining position M1 of the machining device 10 for the pallet P at the standby position M2. That is, the pallet changer 20 is operated to move the workpiece W that has not been machined to the machining position M1 and to move the machined product formed by the machining device 10 to the standby position M2.

The pallet storage room 30 stores a plurality of the pallets P. The LD-STs 41, 42 are places through which the pallets P, to which new workpieces W are attached by workers, are loaded into the FMS. The LD-STs 41, 42 are also places through which machined products are carried out from the FMS. In the present embodiment, two LD-STs are illustrated. Each of the LD-STs 41, 42 has a panel on which an operation is performed by the worker. The worker inputs a mode (a normal mode, an urgent mode, or a super-urgent mode) indicating the degree of urgency to machining of the workpiece W is input into the panel.

The conveyor 50 is movable on two linear rails disposed between the pallet storage room 30, and the machining device 10 and the LD-STs 41, 42. In FIG. 1, the conveyor 50 is movable rightward and leftward. The conveyor 50 conveys the pallets P between the pallet storage room 30, the LD-STs 41, 42, and the standby position M2 of the pallet changer 20.

The first controller 60 controls the machining device 10 and the pallet changer 20. Specifically, the first controller 60 controls, for example, a machining operation by the machining device 10, and controls a pallet position exchanging operation by the pallet changer 20. When new super-urgent items are loaded on the LD-STs 41, 42, the first controller 60 acquires signals from the LD-STs 41, 42 to execute the following process.

The second controller 70 controls the conveyor 50. The second controller 70 controls the conveyor 50 such that the workpieces W are machined according to the stored order of priority for machining of the workpieces W. A mode indicating the degree of urgency is input by the worker when a new item is loaded on each of the LD-STs 41, 42. The second controller 70 acquires signals from the LD-STs 41, 42 to determine the order of priority.

Basically, when the workpieces W, which are new normal items, are loaded, the second controller 70 executes control to convey the pallets P such that the workpieces W are machined according to a loading order. However, when an urgent item or a super-urgent item is loaded, the second controller 70 executes control to convey the pallets P in an order different from the loading order such that a high priority is given to machining of the urgent item or the super-urgent item.

Information stored in the second controller 70 will be described with reference to FIG. 2. As illustrated in FIG. 2, the second controller 70 stores the pallet number, position, mode, priority order, and machining status for each of the pallets P. The position means one of the pallet storage position in the pallet storage room 30, the machining position, and the standby position. The mode means the information indicating the degree of urgency, and is one of the normal mode for a normal item, the urgent mode for an urgent item, and the super-urgent mode for a super-urgent item. The priority order means the order of conveying the pallets P from the pallet storage room 30 to the machining device 10. In principle, the pallets P are carried out in the order of priority. The machining status indicates whether the workpiece W is in a machining-waiting state (pre-machining state) or in a machining completion state (machined product state).

Next, description will be provided on processes executed by the first controller 60 and the second controller 70 based on each mode when the pallets P to which the workpieces W, which are new items, are attached are loaded on the LD-STs 41, 42.

Figure 3:
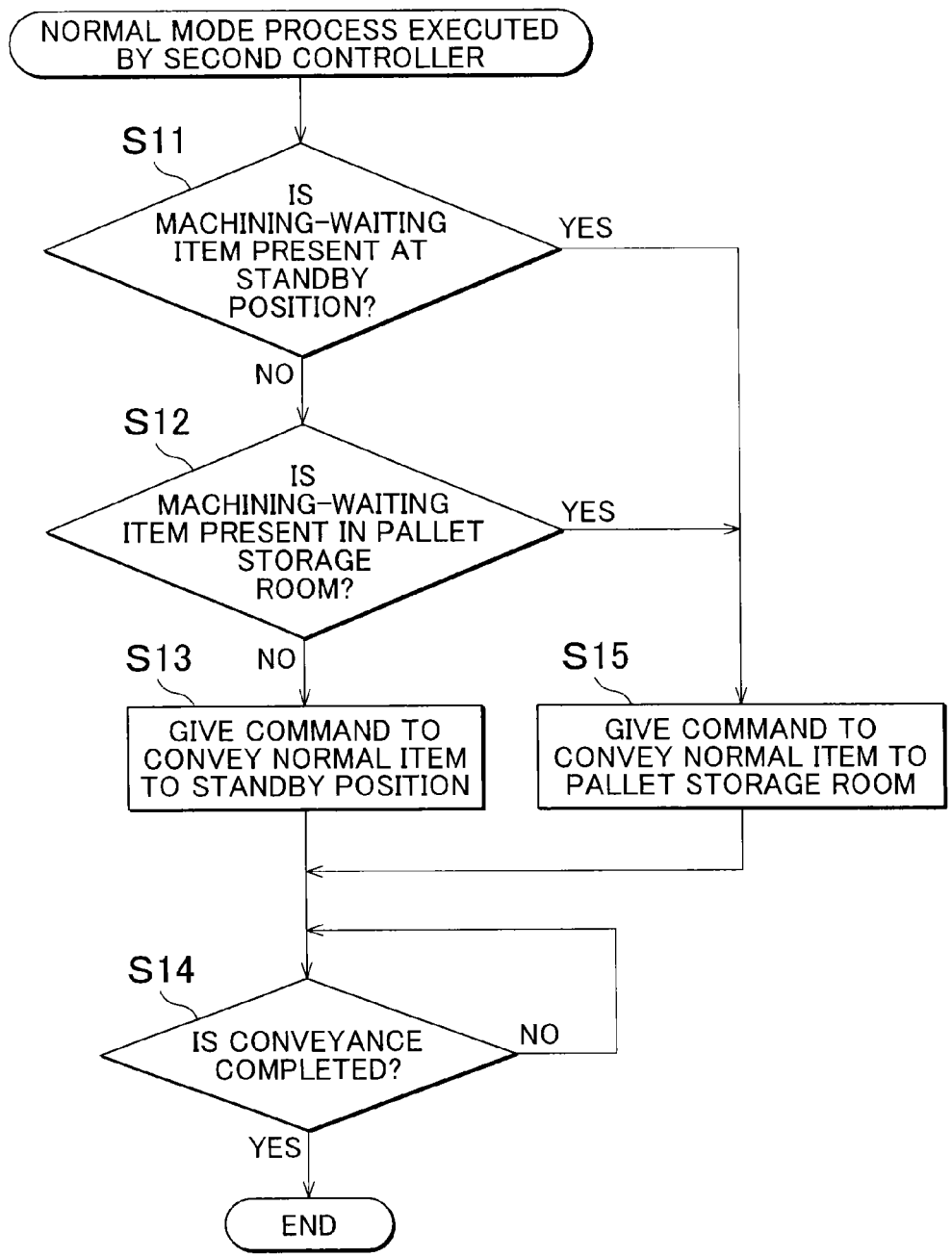
FIG. 3 is a flowchart illustrating a normal mode process executed by the second controller.

First, a normal mode process executed by the second controller 70 will be described with reference to FIG. 1 and a flowchart in FIG. 3. It is determined whether the pallet P to which the workpiece W, which has not been machined (hereinafter, referred to as "machining-waiting item W"), is present at the standby position M2 of the pallet changer 20 (S11). When the machining-waiting item W is not present at the standby position M2 (S11: NO), it is then determined whether the machining-waiting item W is present in the pallet storage room 30 (S12).

When the machining-waiting item W is not present in the pallet storage room 30 (S12: NO), that is, when the machining-waiting item W is present neither at the standby position M2 nor in the pallet storage room 30, a command is given to the conveyor 50 to convey the newly-loaded normal item W to the standby position M2 of the pallet changer 20 (S13). Then, the conveyor 50 moves to a position near the LD-STs 41, 42, receives the pallet P to which the normal item W is attached from the LD-ST 41 or 42, moves to a position near the standby position M2, and transfers the pallet P to the standby position M2. When the conveyance of the pallet P is completed, the process ends (S14: YES).

On the other hand, when the machining-waiting item W is present at the standby position M2 (S11: YES), or when the machining-waiting item W is present in the pallet storage room 30 (S12: YES), a command is given to the conveyor 50 to convey the newly-loaded normal item W to the pallet storage room 30 (S15). The conveyor 50 moves to a position near the LD-STs 41, 42, receives the pallet P to which the normal item W is attached from the LD-ST 41 or 42, moves to a position near an empty space in the pallet storage room 30, and transfers the pallet P to the empty space in the pallet storage room 30. When the conveyance of the pallet P is completed, the process ends (S14: YES).

Next, an urgent mode process executed by the second controller 70 will be described with reference to FIG. 4. First, it is determined whether the pallet P to which the machining-waiting item W is attached is present at the standby position M2 of the pallet changer 20 (S21). When the machining-waiting item W is not present at the standby position M2 (S21: NO), it is then determined whether the machining-waiting item W, which is a super-urgent item or an urgent item, is present in the pallet storage room 30 (S22).

When the machining-waiting item W, which is a super-urgent item or an urgent item, is not present in the pallet storage room 30 (S22: NO), a command is given to the conveyor 50 to convey the newly-loaded urgent item W to the standby position M2 of the pallet changer 20 (S23). When the conveyance of the pallet P is completed, the process ends (S24: YES).

On the other hand, when the machining-waiting item W is present at the standby position M2 (S21: YES), or when the machining-waiting item W, which is a super-urgent item or an urgent item, is present in the pallet storage room 30 (S22: YES), a command is given to the conveyor 50 to convey the newly-loaded urgent item W to the pallet storage room 30 (S25). When the conveyance of the pallet P is completed, the process ends (S24: YES).

That is, when the machining-waiting item W is not present at the standby position M2 and the machining-waiting item W, which is a super-urgent item or an urgent item, is present in the pallet storage room 30, a high priority is given to the conveyance of the super-urgent item or the urgent item to the standby position M2. On the other hand, when only the machining-waiting item W, which is a normal item, is present in the pallet storage room 30, a high priority is given to the conveyance of the newly-loaded urgent item W to the standby position.

Next, a super-urgent mode process executed by the second controller 70 will be described with reference to FIG. 5. First, it is determined whether the pallet P to which the machining-waiting item W is attached is present at the standby position M2 of the pallet changer 20 (S31). When the machining-waiting item W is not present at the standby position M2 (S31: NO), it is then determined whether the machining-waiting item W, which is a super-urgent item, is present in the pallet storage room 30 (S32).

When the machining-waiting item W, which is a super-urgent item, is not present in the pallet storage room 30 (S32: NO), a command is given to the conveyor 50 to convey the newly-loaded super-urgent item W to the standby position M2 of the pallet changer 20 (S33). When the conveyance of the pallet P is completed, the process ends (S34: YES).

On the other hand, when the machining-waiting item W is present at the standby position M2 (S31: YES), it is determined whether the machining-waiting item W, which is a super-urgent item, is present at the standby position M2 (S35). When the machining-waiting item W, which is a super-urgent item, is present at the standby position M2 (S35: YES), or when it is determined in step S32 that the machining-waiting item W, which is a super-urgent item, is present in the pallet storage room 30 (S32: YES), a command is given to the conveyor 50 to convey the newly-loaded super-urgent item W to the pallet storage room 30 (S36). When the conveyance of the pallet P is completed, the process ends (S34: YES).

When it is determined in step S35 that the super-urgent item W is not present at the standby position M2 (S35: NO), the machining-waiting item W, which is a normal item or an urgent item, is present at the standby position M2. Thus, a command is given to the conveyor 50 to convey the machining-waiting item W present at the standby position M2 to the pallet storage room 30 (S37). When the conveyance is completed (S38: YES), a command is given to the conveyor 50 to convey the newly-loaded super-urgent item W to the standby position M2 (S39). When the conveyance of the pallet P is completed, the process ends (S34: YES).

That is, when the machining-waiting item W other than the super-urgent item W is present at the standby position M2, a higher priority is given to conveyance of the newly-loaded super-urgent item W to the standby position M2 than holding of the machining-waiting item W at the standby position M2. Thus, a higher priority is given to the newly-loaded super-urgent item W than the normal item or the urgent item, which has already been conveyed to the standby position M2. When the super-urgent item W is already present at the standby position M2, a higher priority is given to machining of the super-urgent item W at the standby position M2 and thus the newly-loaded super-urgent item W is conveyed to the pallet storage room 30.

Next, a super-urgent mode process executed by the first controller 60 will be described with reference to FIG. 6. As described above, in the super-urgent mode process, when the machining-waiting item W, which is a normal item or an urgent item, is present at the standby position M2, the second controller 70 executes control to convey the normal item or the urgent item at the standby position M2 to the pallet storage room 30 and then convey the newly-loaded super-urgent item W to the standby position M2.

However, the first controller 60 controls the machining device 10 and the pallet changer 20 independently of the control of the conveyor 50, which is executed by the second controller 70. Therefore, immediately after the second controller 70 gives a command to the conveyor 50 to convey the pallet P at the standby position M2 of the pallet changer 20 to the pallet storage room 30, the first controller 60 may execute control to start an operation for exchanging the pallets P between the machining position M1 of the machining device 10 and the standby position M2 of the pallet changer 20. Therefore, the first controller 60 executes the following process.

Figure 6:
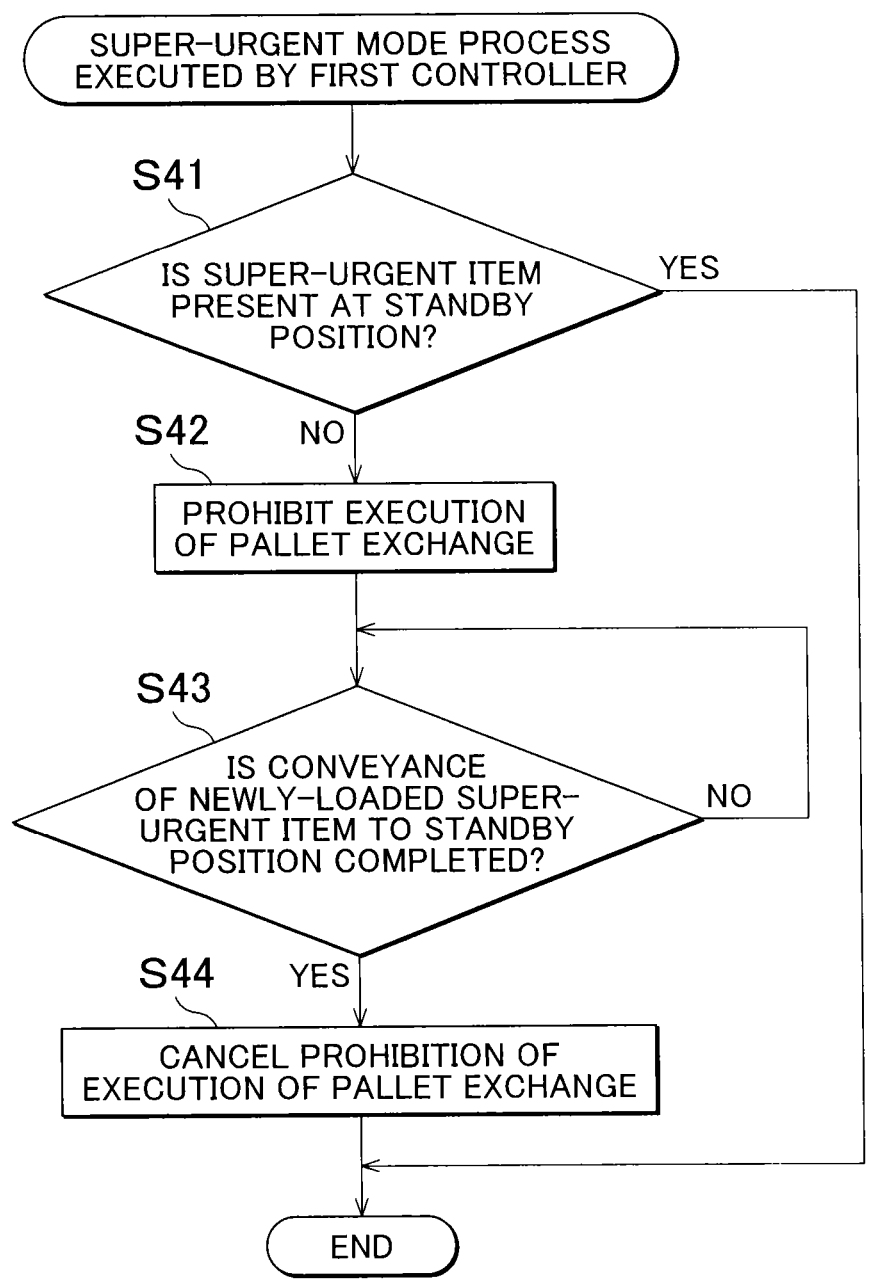
FIG. 6 is a flowchart illustrating a super-urgent mode process executed by a first controller.

As illustrated in FIG. 6, when the new super-urgent item W is loaded on the LD-ST 41 or 42, the first controller 60 determines whether the machining-waiting item W, which is a super-urgent item, is present at the standby position M2 (S41). This determination may be made based on the information transmitted from the second controller 70.

When the machining-waiting item W, which is a super-urgent item, is present at the standby position M2 (S41: YES), the process ends without proceeding to the next step. When the machining-waiting item W, which is a super-urgent item, is not present at the standby position M2 (S41: NO), the first controller 60 prohibits the exchange of the pallets P (S42).

Usually, when the machining of the workpiece W attached to the pallet P at the machining position M1 ends, exchange of the pallet P at the machining position M1 and the pallet P at the standby position M2 is performed by the pallet changer 20. However, if the pallet exchange is prohibited in step S42, even if the machining of the workpiece W at the machining position M1 by the machining device 10 ends, the pallet exchange by the pallet changer 20 is not performed.

Subsequently, when the conveyance of the newly-loaded super-urgent item W to the standby position M2 is completed (S43: YES), the prohibition of the exchange of the pallet P is cancelled (S44). That is, when the super-urgent item W is newly loaded, the exchange of the pallets P by the pallet changer 20 is not performed until the newly-loaded super-urgent item W is conveyed to the standby position M2.

After the newly-loaded super-urgent item W is conveyed to the standby position M2, the exchange of the pallets P is performed by the pallet changer 20. That is, in this case, the item to be machined by the machining device 10 is the newly-loaded super-urgent item W.

Next, a priority order determination process executed by the second controller 70 will be described. The order of priority is the order of conveying the pallet P from the pallet storage room 30 to the machining device 10. As illustrated in FIG. 2, the second controller 70 assigns the priority order to each pallet P and stores the priority order. The conveyor 50 conveys the pallets P from the pallet storage room 30 to the machining device 10 in a descending order of priority.

Figure 7:
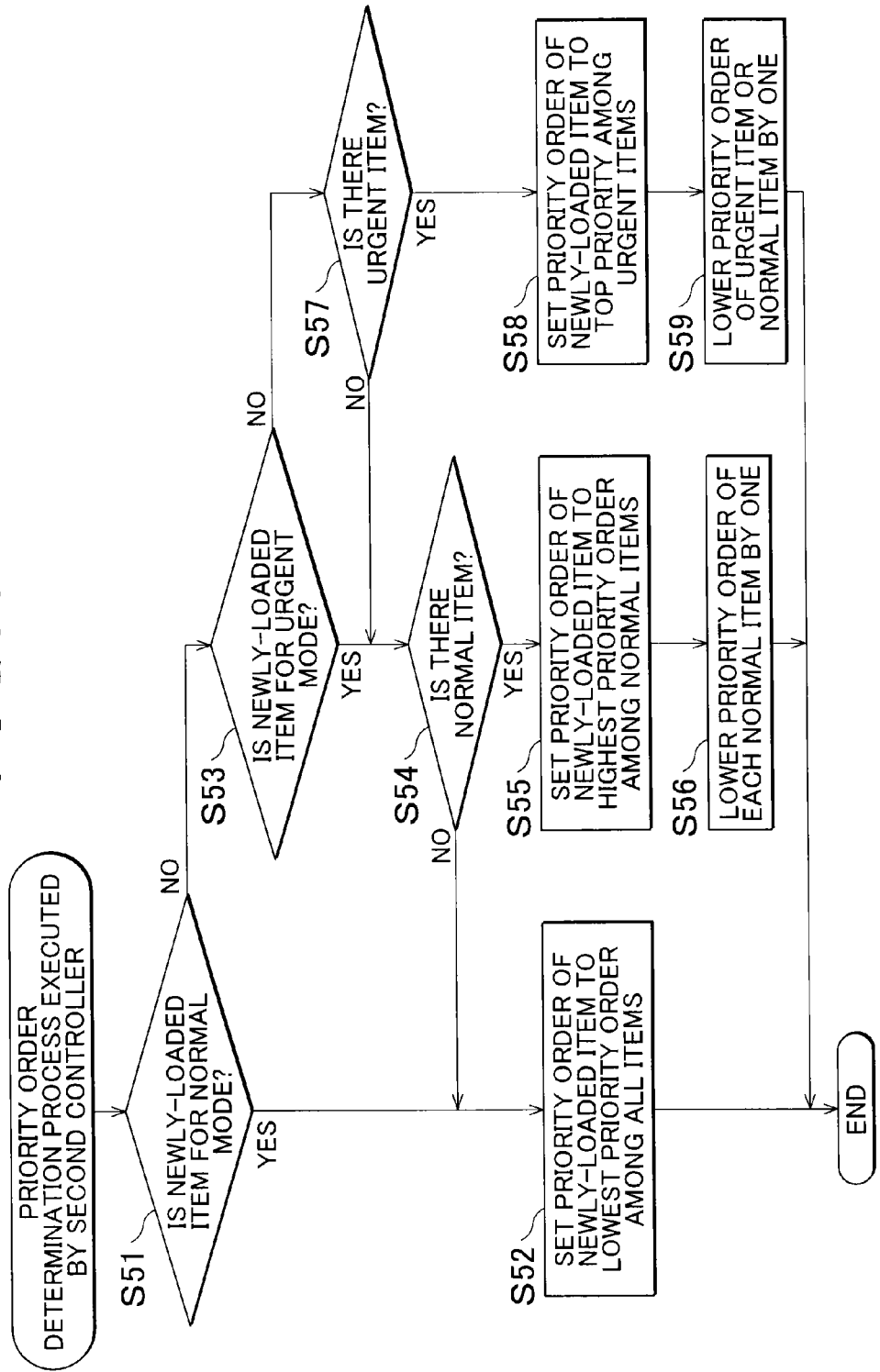
FIG. 7 is a flowchart illustrating a priority order determination process executed by the second controller.

In principle, the order of priority coincides with the order of loading the pallets P from the LD-STs 41, 42 into the FMS. However, when an urgent item or a super-urgent item is loaded, the priority order of the pallet P loaded earlier is changed. Hereinafter, the priority order determination process executed by the second controller 70 will be described with reference to FIG. 7.

The second controller 70 determines whether the newly-loaded workpiece W is an item for the normal mode process (S51). When the newly-loaded workpiece W is an item for the normal mode, that is, when the normal item W is newly loaded into the FMS (S51: YES), the priority order of the newly-loaded normal item W is set to the lowest priority order among all the loaded items (S52).

When the newly-loaded workpiece W is not an item for the normal mode (S51: NO), the second controller 70 determines whether the workpiece W is an item for the urgent mode (S53). When the workpiece W is an item for the urgent mode, that is, when the urgent item W is newly loaded (S53: YES), it is determined whether there is the normal item among the workpieces W already loaded into the FMS (S54). When there is no normal item W (S54: NO), the priority order of the newly-loaded urgent item W is set to the lowest priority order among all the loaded items (S52).

On the other hand, when it is determined in step S54 that there is the normal item W (S54: YES), the priority order of the newly-loaded urgent item W is set to the highest priority order among the already loaded normal items W (S55). Subsequently, the priority order of each of the normal items W is lowered by one (S56).

When it is determined in step S53 that the workpiece W is not an item for the urgent mode, that is, when the super-urgent item W is newly loaded (S53: NO), it is determined whether there is the urgent item among the workpieces W already loaded into the FMS (S57). When it is determined in step S57 that there is the urgent item W (S57: YES), the priority order of the newly-loaded super-urgent item W is set to the highest priority order among the urgent items W already loaded (S58). Subsequently, the priority order of each of the urgent items W and the normal items W is lowered by one (S59).

On the other hand, when it is determined in step S57 that there is no urgent item W (S57: NO), the same processes as those in and after S54 are executed. That is, when there is neither the urgent item W nor the normal item W in the FMS (S57: NO, S54: NO), the priority order of the newly-loaded super-urgent item W is set to the lowest priority order among all the loaded items (S52).

When it is determined in step S57 that there is no urgent item W but there is the normal item W (S57: NO, S54: YES), the priority order of the newly-loaded super-urgent item W is set to the highest priority order among the normal items W already loaded (S55). Subsequently, the priority order of each of the normal items W is lowered by one (S56).

Next, examples of the actual operations according to the present embodiment will be described. Hereinafter, description will be provided on the transfer of the pallets P to which the workpieces W are attached and which are newly loaded on the LD-STs 41, 42. Specifically, description will be provided on the transfer of the pallets P in the case where the newly-loaded workpiece W is a normal item, in the case where the newly-loaded workpiece W is an urgent item, and in the case where the newly-loaded item is a super-urgent item.

Figure 8:
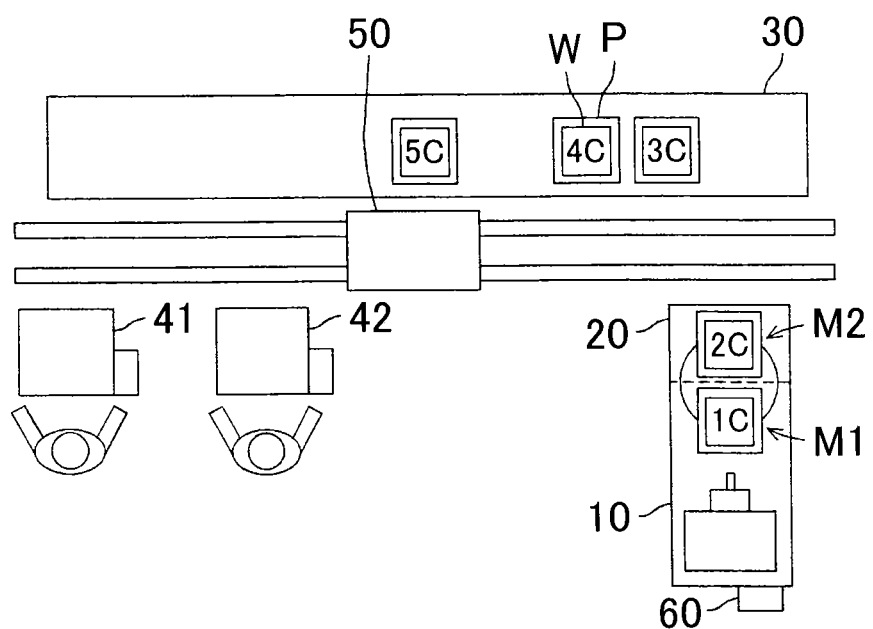
FIG. 8 is a view illustrating an initial state before a new item is loaded.

First, the operation when the normal item W is newly loaded will be described with reference to FIG. 8 and FIG. 9. The initial state is as illustrated in FIG. 8. In the following drawings and description, the numeral at the top in each of the reference symbols assigned to pallets P represents the priority order, and the characters A, B, C after the numerals respectively represent a super-urgent item, an urgent item, and a normal item. For example, a reference symbol 5C means that the priority order of the item is the fifth from the top priority and the item is a normal item. A reference symbol 1B means that the item has the top priority and is an urgent item. A reference symbol 2A means that the priority order of the item is the second from the top priority and the item is a super-urgent item.

As illustrated in FIG. 8, in the initial state, a normal item 1C is at the machining position M1, a normal item 2C is at the standby position M2, and normal items 3C, 4C, 5C are present in the pallet storage room 30.

Figure 9:
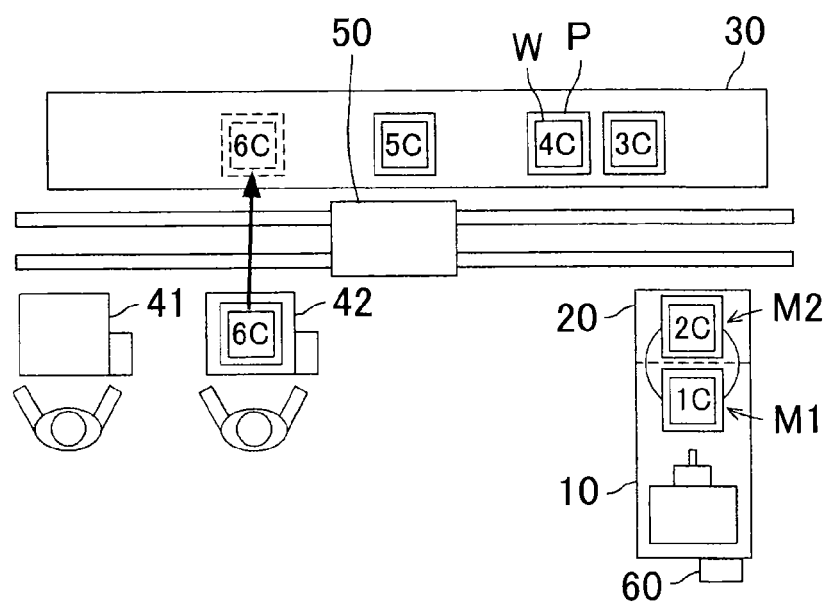
FIG. 9 is a view illustrating a state where a new normal item is loaded after the initial state in FIG. 8.

After this state, as illustrated in FIG. 9, the normal item W is newly loaded on the LD-ST 42. In this case, in the priority order determination process in the flowchart in FIG. 7 executed by the second controller 70, an affirmative determination is made in step S51 and the priority order of the loaded normal item W is set to the sixth from the top priority. Therefore, the loaded normal item W is denoted by 6C. In the pallet conveyance process in FIG. 3 executed by the second controller 70, an affirmative determination is made in step S11 and a command is given to the conveyor 50 to convey a loaded normal item 6C to the pallet storage room 30 in step S15. Thus, as illustrated in FIG. 9, the normal item 6C is conveyed to the pallet storage room 30 by the conveyor 50.

Figure 10:
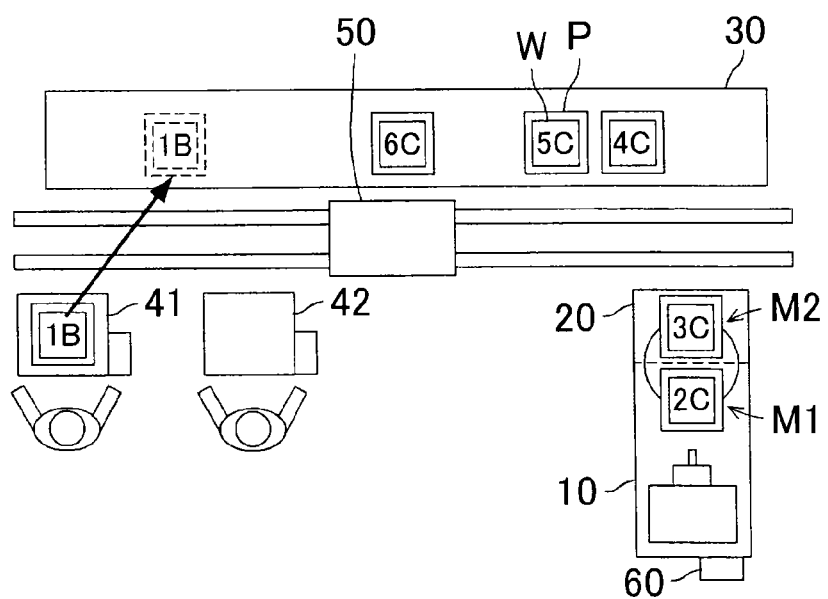
FIG. 10 is a view illustrating a state where a new urgent item is loaded after the initial state in FIG. 8.

Next, the operation when the urgent item W is newly loaded will be described. After the initial state in FIG. 8, the urgent item W is newly loaded on the LD-ST 41 as illustrated in FIG. 10. In this case, in the priority order determination process in FIG. 7 executed by the second controller 70, a negative determination is made in step S51, an affirmative determination is made in each of step S53 and step S54, the priority order of the loaded urgent item W set to the top priority in step S55, and the priority order of each of other normal items W is lowered by one in step S56.

Figure 4:
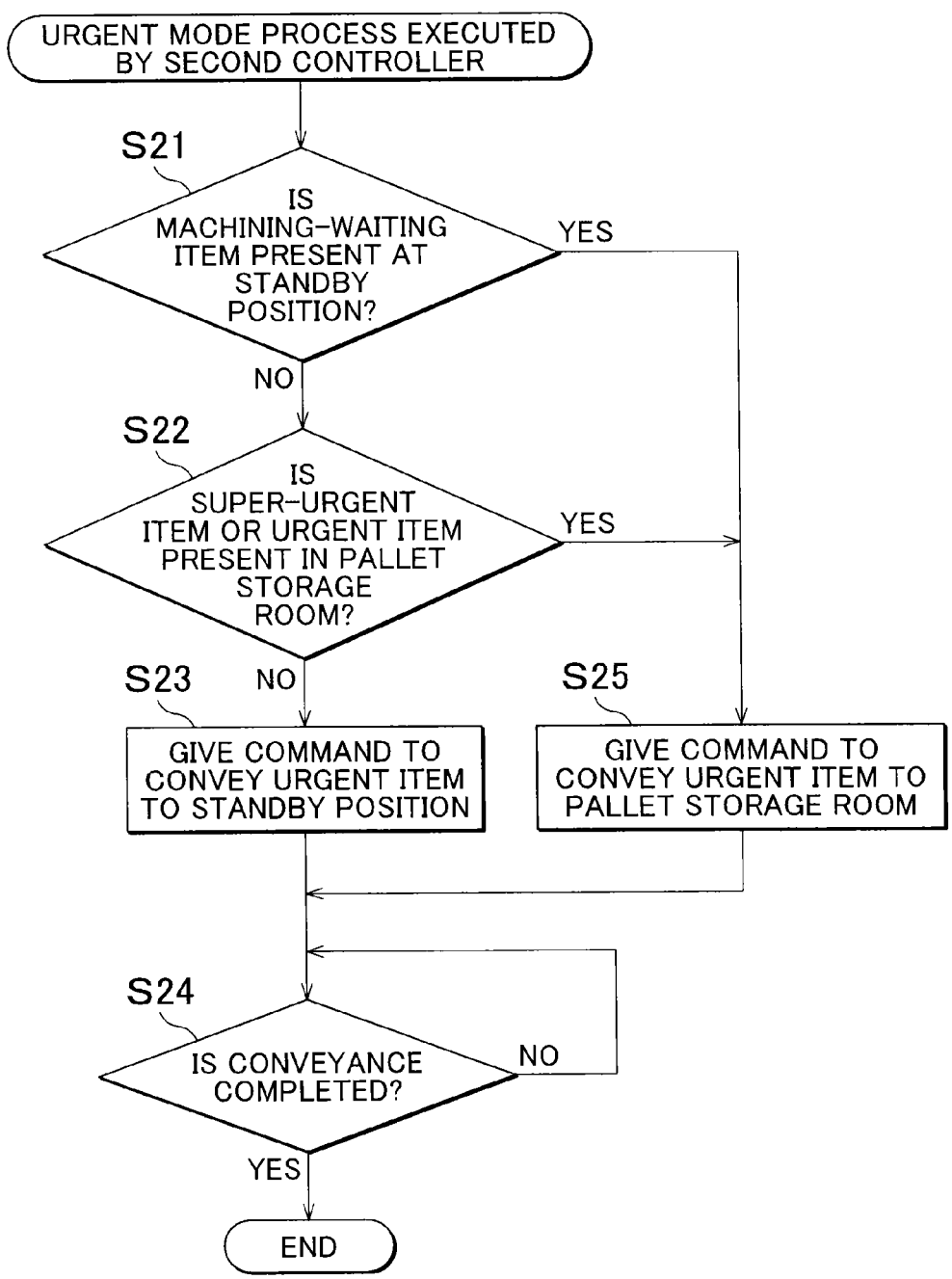
FIG. 4 is a flowchart illustrating an urgent mode process executed by the second controller.

In the pallet conveyance process in FIG. 4 executed by the second controller 70, an affirmative determination is made in step S21 and a command is given to the conveyor 50 to convey a loaded urgent item 1B to the pallet storage room 30. Thus, as illustrated in FIG. 10, the urgent item 1B is conveyed to the pallet storage room 30 by the conveyor 50.

Figure 11:
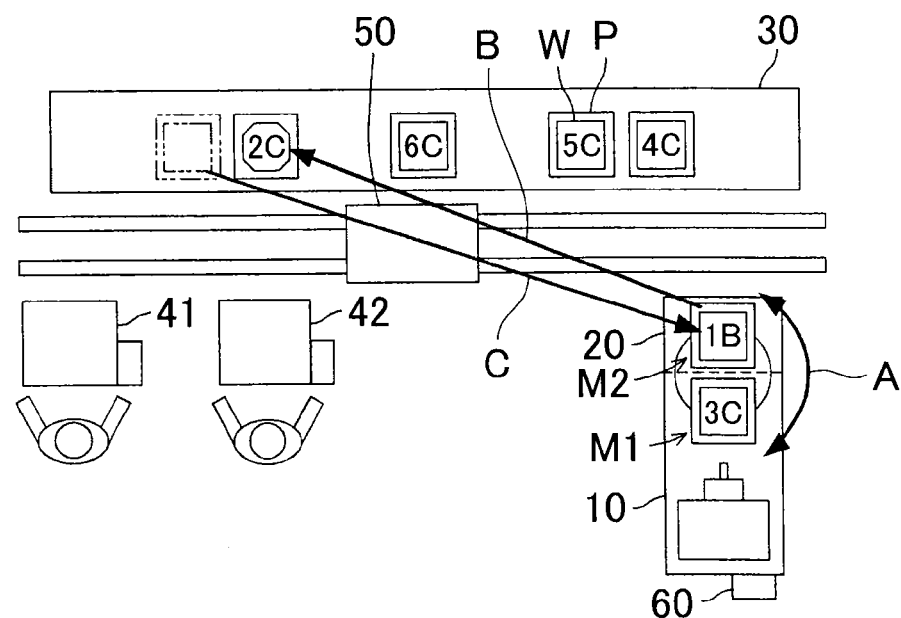
FIG. 11 is a view illustrating a state achieved after the state in FIG. 10.

Then, when the machining of the normal item 2C being machined by the machining device 10 is completed, as illustrated in FIG. 11, the pallet P at the machining position M1 and the pallet P at the standby position M2 are exchanged by the pallet changer 20 (indicated by arrows A in FIG. 11). Subsequently, the machined normal item 2C at the standby position M2 is conveyed to the pallet storage room 30 (indicated by an arrow B in FIG. 11). Subsequently, the urgent item 1B that has been conveyed to the pallet storage room 30 is conveyed to the standby position M2 (indicated by an arrow C in FIG. 11). Then, after the machining of the normal item 3C is completed, the urgent item 1B is machined.

Figure 12:
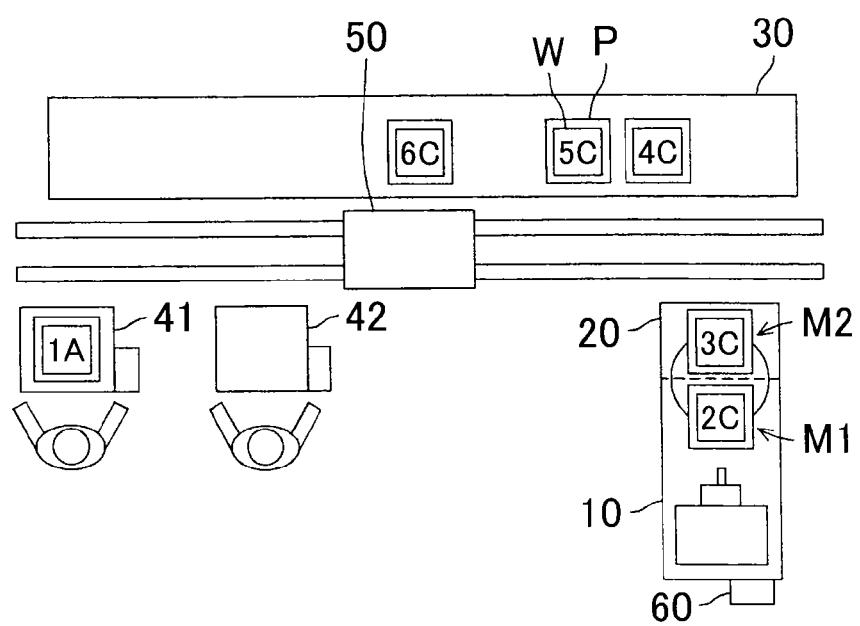
FIG. 12 is a view illustrating a state where a new super-urgent item is loaded after the initial state in FIG. 8.

Next, the operation when the super-urgent item W is newly loaded will be described. After the initial state in FIG. 8, the new super-urgent item W is loaded on the LD-ST 41 as illustrated in FIG. 12. In this case, in the priority order determination process in FIG. 7 executed by the second controller 70, a negative determination is made in each of step S51, step S53 and step S57, an affirmative determination is made in step S54, and step S55 and step S56 are executed. As a result, the priority order of the loaded super-urgent item W is set to the top priority, and the priority order of each of other normal items W is lowered by one.

Figure 5:
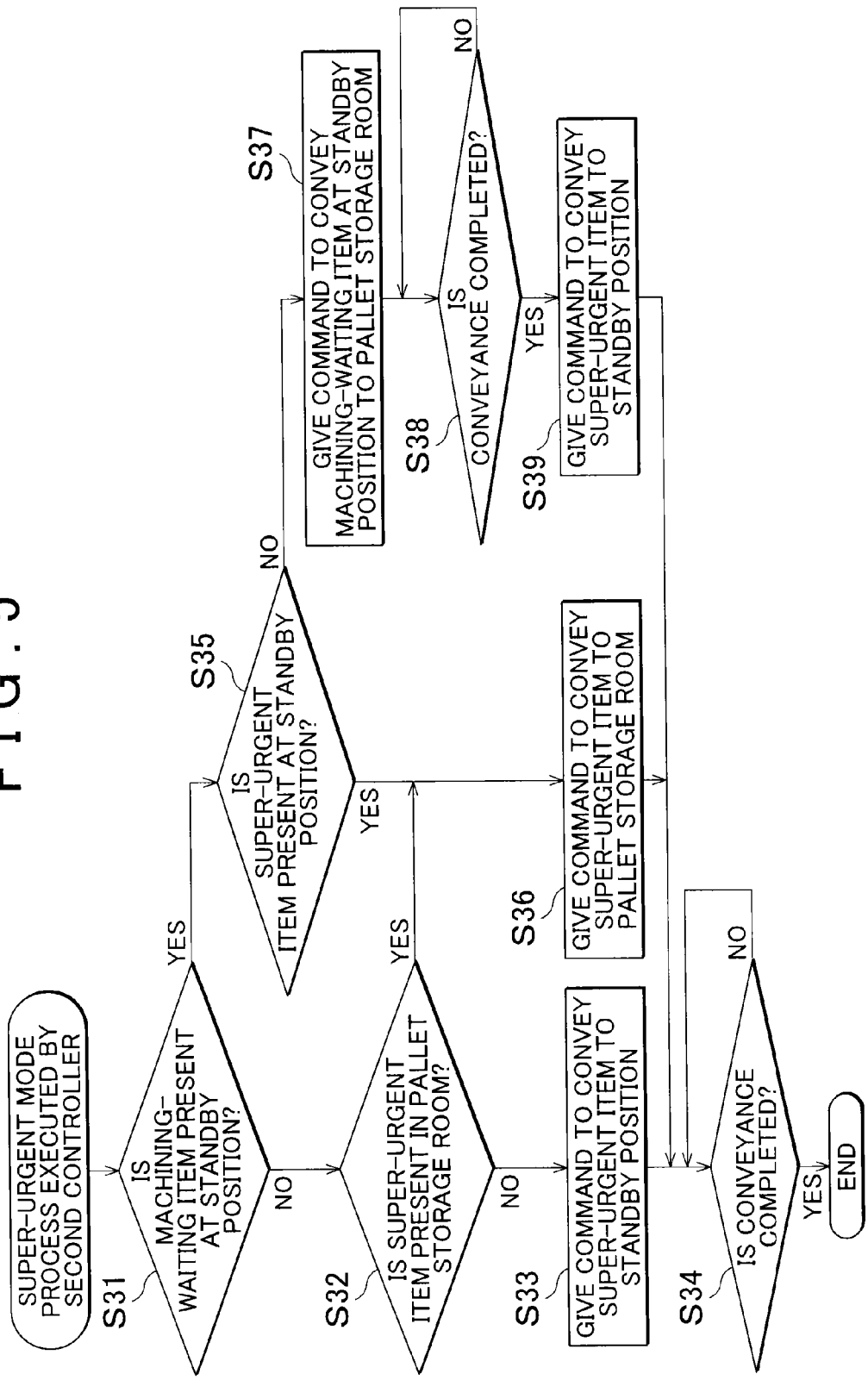
FIG. 5 is a flowchart illustrating a super-urgent mode process executed by the second controller.
Figure 13:
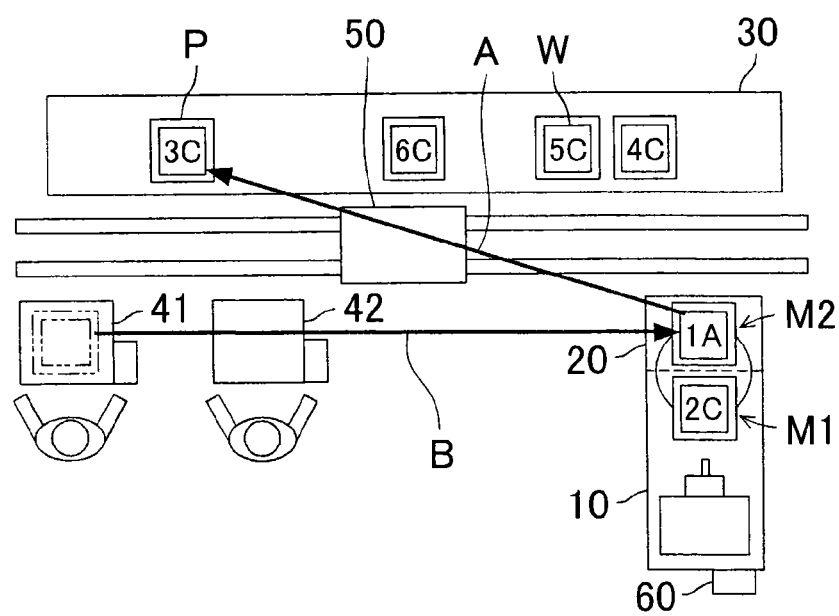
FIG. 13 is a view illustrating a state achieved after the state in FIG. 12.

In the pallet conveyance process in FIG. 5 executed by the second controller 70, an affirmative determination is made in step S31, a negative determination is made in step S35, and a command is given to the conveyor 50 to convey the normal item 3C at the standby position M2 to the pallet storage room 30 in step S37 (indicated by an arrow A in FIG. 13). Subsequently, in the process in FIG. 5, step S37 is executed, an affirmative determination is made in step S38, and a command is given to the conveyor 50 to convey a loaded super-urgent item 1A to the standby position M2 in step S39 (indicated by an arrow B in FIG. 13).

Then, as illustrated in FIG. 13, when the machining of the normal item 2C being machined by the machining device 10 is completed, the pallet P at the machining position M1 and the pallet P at the standby position M2 are exchanged by the pallet changer 20, and the super-urgent item 1A is machined.

Figure 14:
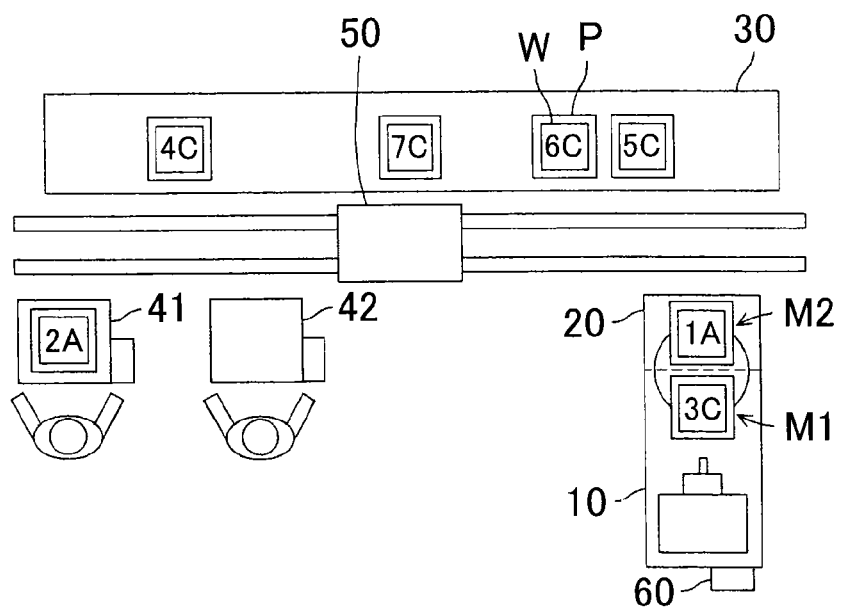
FIG. 14 is a view illustrating a state achieved after the state in FIG. 13.

After the state in FIG. 13, the new super-urgent item W is loaded on the LD-ST 41 as illustrated in FIG. 14. In this case, in the priority order determination process in FIG. 7 executed by the second controller 70, a negative determination is made in each of step S51 and step S53, an affirmative determination is made in step S57, the priority order of the loaded super-urgent item W is set to the second from the top priority in step S58, and the priority of each of the normal items W other than the super-urgent item 1A loaded earlier is lowered by one in step S59.

Figure 15:
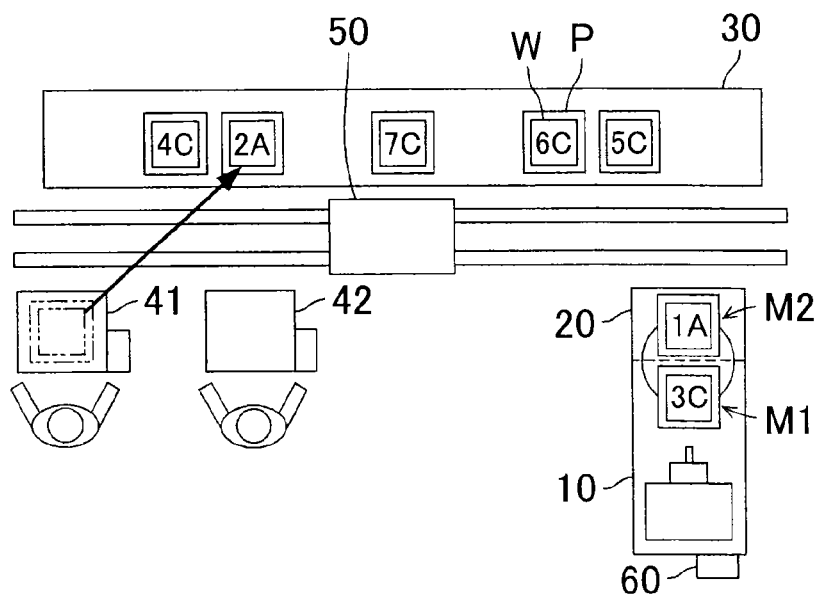
FIG. 15 is a view illustrating a state achieved after the state in FIG. 14.

In the pallet conveyance process in FIG. 5 executed by the second controller 70, an affirmative determination is made in step S31, an affirmative determination is made in step S35, and a command is given to the conveyor 50 to convey a loaded super-urgent item 2A to the pallet storage room 30 in step S36. Thus, as illustrated in FIG. 15, the super-urgent item 2A is conveyed to the pallet storage room 30 by the conveyor 50.

Then, when the machining of the normal item 3C being machined by the machining device 10 is completed, the pallet P at the machining position M1 and the pallet P at the standby position M2 are exchanged by the pallet changer 20, and the super-urgent item 1A is machined. The machined normal item 3C at the standby position M2 is conveyed to the pallet storage room 30, and the super-urgent item 2A that has been conveyed to the pallet storage room 30 is conveyed to the standby position M2. Then, after the machining of the super-urgent item 1A is completed, the super-urgent item 2A is machined.

As described above, immediately before the super-urgent item 2A is loaded, the different super-urgent item 1A may have already been loaded. In the present embodiment, when the super-urgent item 1A loaded earlier is present at the standby position M2, instead of conveying the super-urgent item 1A loaded earlier to the pallet storage room 30, the super-urgent item 2A loaded later is conveyed to the pallet storage room 30. That is, the super-urgent item 1A loaded earlier is machined first, and then, the super-urgent item 2A loaded later is machined. As a result, when there is a plurality of super-urgent items W, the super-urgent items W are machined according to the loading order.

Next, the operation in an embodiment in which a plurality of machining devices is provided will be described. The embodiment in which the FMS includes the single machining device 10 has been described. Next, the embodiment in which the FMS includes two machining devices 10, 11 will be described with reference to FIG. 16 and FIG. 17. Two pallet changers 20, 21 are provided so as to correspond to the machining devices 10, 11.

In this case, a super-urgent mode process by the second controller 70 is executed as follows. When the super-urgent items W are present at the standby positions M2 of all of the pallet changers 20, 21 (see FIG. 16) (corresponding to YES in S35 in FIG. 5), the newly-loaded super-urgent item W is conveyed to the pallet storage room 30. Then, the super-urgent item W is conveyed to the machining device 10 or 11 according to the priority order, and machined. The same applies to the case where other super-urgent items W are present in the pallet storage room 30 (corresponding to YES in S32 in FIG. 5).

When the machining-waiting items W are not present at the standby positions M2 of all the pallet changers 20, 21, and other super-urgent items W are not present in the pallet storage room 30 (corresponding to NO in S32 in FIG. 5), the newly-loaded super-urgent item W is conveyed to one of the pallet changers 20, 21. Note that, the manner of selecting the pallet changer to which the newly-loaded super-urgent item is conveyed among the pallet changers 20, 21 will be described later.

The cases where the super-urgent items W are not present at the standby positions M2 of all the pallet changers 20, 21 (corresponding to NO in S35 in FIG. 5) include the following three cases. There is a first case where the urgent item W or the normal item W is present at each of all the standby positions M2 of the pallet changers 20, 21. There is a second case where the super-urgent item W is present at the standby position M2 of one of the pallet changers 20, 21 and no item is present at the standby position M2 of the other one of the pallet changers 20, 21. There is a third case where the super-urgent item W is present at the standby position M2 of one of the pallet changers 20, 21 and the urgent item W or the normal item W is present at the standby position M2 of the other one of the pallet changers 20, 21.

In the second and third cases, the newly loaded super-urgent item W is conveyed to the standby position M2 at which the super-urgent item W is not present. In the first case and a case where the machining-waiting items W are not present at any standby positions M2 of the pallet changers 20, 21, there is a plurality of standby positions M2 to which the newly-loaded super-urgent item W may be conveyed. In the third case, there may be a plurality of the standby positions M2 to which the newly-loaded super-urgent item W is conveyed.

When there is a plurality of the standby positions M2 to which the newly-loaded super-urgent item W may be conveyed, the super-urgent item W is conveyed to the machining device with a shorter remaining machining time on the workpiece W that is presently being machined, among the machining devices 10, 11.

Figure 16:
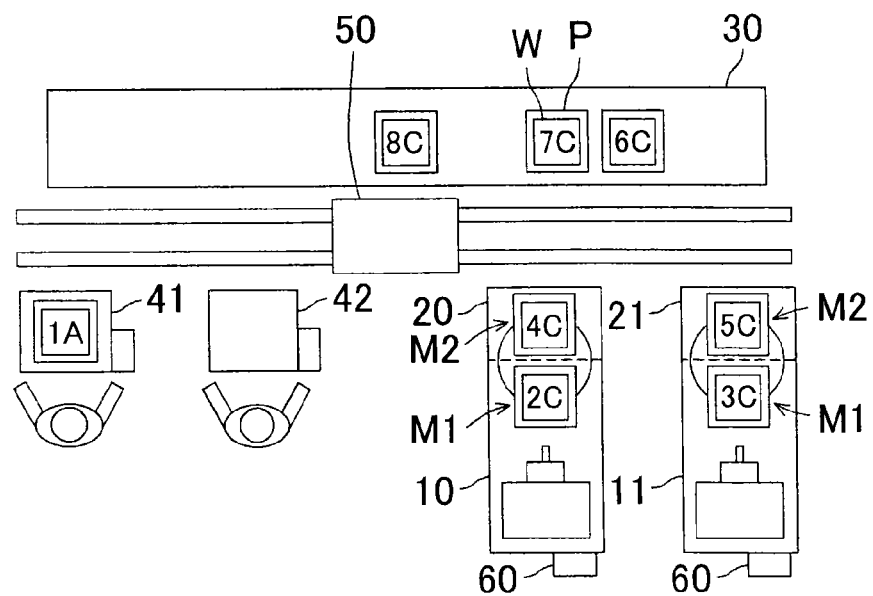
FIG. 16 is a view illustrating a state where a new super-urgent item is loaded in an embodiment in which a plurality of machining devices is provided.

Hereinafter, a concrete conveying operation of conveying the super-urgent item W will be described. FIG. 16 illustrates a case where the super-urgent item W is loaded on the LD-ST 41. The loaded super-urgent item 1A has the top priority. At this time, the normal item 2C is at the machining position M1 of the first machining device 10, and the normal item 4C is at the standby position M2 of the first pallet changer 20. The normal item 3C is at the machining position M1 of the second machine 11, and the normal item 5C is at the standby position M2 of the second pallet changer 21. Normal items 6C, 7C, and 8C are present in the pallet storage room 30.

Because the super-urgent item 1A is loaded on the LD-ST 41, one of the normal items at the standby positions M2 of the pallet changers 20, 21 is conveyed to the pallet storage room 30, and the super-urgent item 1A is conveyed to the standby position M2 from which the normal item is carried out.

The process of determining which of the normal items at the standby positions M2 of the two pallet changers 20, 21 is carried out is executed as follows. When the super-urgent item 1A is loaded on one of the LD-STs 41, 42, the second controller 70 determines the machining device with a shorter remaining machining time on the workpiece W that is presently being machined, between the two machining devices 10, 11. The following description will be provided on the assumption that the remaining machining time of the first machining device 10 is shorter than that of the second machining device 11.

Figure 17:
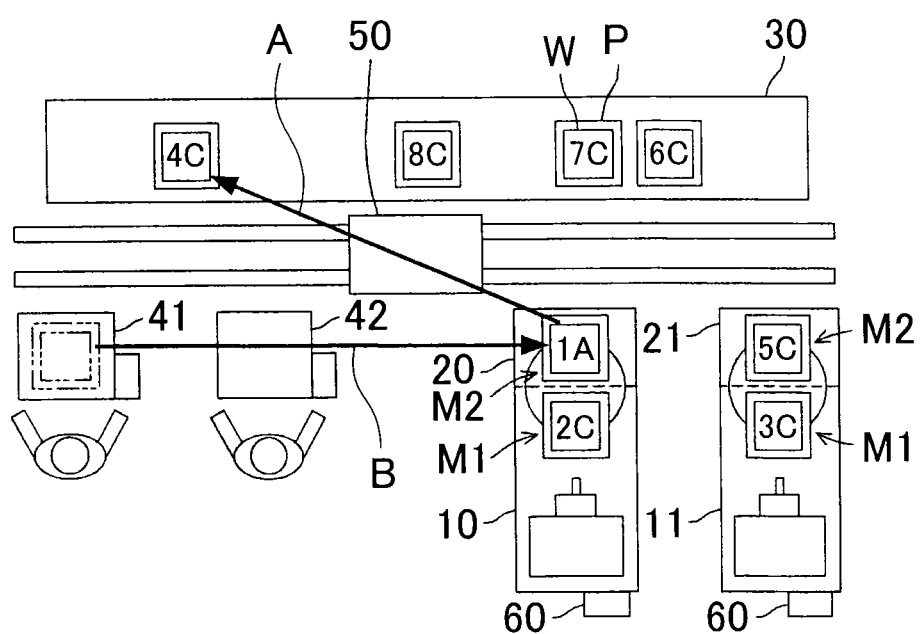
FIG. 17 is a view illustrating a state achieved after the state in FIG. 16.

At this time, the second controller 70 gives a command to the conveyor 50 to convey the normal item 4C at the standby position M2 of the pallet changer 20 for the first machining device 10, to the pallet storage room 30. Thus, as illustrated in FIG. 17, the normal item 4C is conveyed to the pallet storage room 30 by the conveyor 50 (indicated by an arrow A in FIG. 17). Subsequently, a command is given to the conveyor 50 to convey the loaded super-urgent item 1A to the standby position M2 of the first pallet changer 20 (indicated by an arrow B in FIG. 17).

In this way, when a plurality of the machining devices 10, 11 is provided, the super-urgent item 1A is conveyed to a machining device with a shorter remaining machining time on the workpiece W that is presently being machined, among the plurality of the machining devices. Thus, machining of the loaded super-urgent item 1A is started promptly.

In the above-described embodiment, the first controller 60 and the second controller 70 are configured as separate controllers. However, one controller may have the function as the first controller 60 and the function as the second controller 70 and may execute both the control by the first controller 60 and the control by the second controller 70.

In the above-described embodiment, one workpiece W stands by at the standby position M2 of the pallet changer 20. However, a plurality of workpieces W may stand by at the standby position M2. With this configuration, when the workpiece W is loaded on the loading station (LD-ST), it is possible to more efficiently perform machining based on the mode (the normal mode, the urgent mode, the super-urgent mode) indicating the degree of urgency for the workpiece W and the machining status (the machining-waiting state, the machining completion state) of the workpiece W. That is, the conveying position for the loaded workpiece W is determined based on, for example, the number of workpieces W at the standby position M2, and the mode of urgency for each workpiece W at the standby position M2.

What is claimed is:

1. A flexible manufacturing system comprising:
   a machining device that has a machining position where a pallet to which a workpiece is attached is disposed, and machines the workpiece that has not been machined and that is attached to the pallet disposed at the machining position to form a machined product;
   a pallet storage room that is able to store a plurality of the pallets;
   a loading station through which the pallet to which the new workpiece is attached is loaded into the flexible manufacturing system;
   a pallet changer that is provided integrally with or adjacent to the machining device, has a standby position where the pallet to be moved to the machining position of the machining device stands by, and exchanges the pallet at the machining position for the pallet at the standby position;
   a conveyor that is able to convey the pallet between the pallet storage room, the loading station, and the standby position of the pallet changer, wherein a pallet positioned at the standby position of the pallet changer has been removed from the conveyor;
   a first controller that controls the machining device and the pallet changer; and
   a second controller that controls the conveyor,
   wherein when the pallet to which a workpiece that is a super-urgent item is attached is loaded on the loading station and a pallet is at the standby position, the second controller controls the conveyor to convey the pallet at the standby position to the pallet storage room and then to convey the pallet loaded on the loading station to the standby position.

2. The flexible manufacturing system according to claim 1, wherein:
   the first controller prohibits execution of exchange of the pallets by the pallet changer when the pallet to which the workpiece that is the super-urgent item is attached is loaded on the loading station; and
   the first controller cancels prohibition of exchange of the pallets by the pallet changer after the pallet loaded on the loading station is conveyed to the standby position.

3. The flexible manufacturing system according to claim 1, wherein in a case where the pallet to which the workpiece that has not been machined and that is the super-urgent item is attached is disposed at the standby position, when the pallet to which a workpiece that is another super-urgent item is attached is loaded on the loading station, the second controller controls the conveyor to convey the pallet loaded on the loading station to the pallet storage room.

4. The flexible manufacturing system according to claim 2, wherein in a case where the pallet to which the workpiece that has not been machined and that is the super-urgent item is attached is disposed at the standby position, when the pallet to which a workpiece that is another super-urgent item is attached is loaded on the loading station, the second controller controls the conveyor to convey the pallet loaded on the loading station to the pallet storage room.

5. The flexible manufacturing system according to claim 1, wherein:

a plurality of the machining devices, and a plurality of the pallet changers that correspond to the plurality of the machining devices are provided; and when the pallet to which the workpiece that is the super-urgent item is attached is loaded on the loading station, the second controller i) determines a machining device with a shortest remaining machining time on the workpiece that is presently being machined, among the plurality of the machining devices, ii) controls the conveyor to convey the pallet at the standby position of the pallet changer corresponding to the machining device with the shortest remaining machining time to the pallet storage room, and iii) then controls the conveyor to convey the pallet loaded on the loading station to the standby position of the pallet changer corresponding to the machining device with the shortest remaining machining time.

6. The flexible manufacturing system according to claim 1, wherein the first controller has a function of the second controller, and executes both control by the first controller and control by the second controller.

\* \* \* \* \*